(12) United States Patent
Parrish

(10) Patent No.: US 9,419,420 B1
(45) Date of Patent: Aug. 16, 2016

(54) RIGHT ANGLE CONDUIT BODY WITH OFFSET SPLIT

(71) Applicant: Bradley David Parrish, Rialto, CA (US)

(72) Inventor: Bradley David Parrish, Rialto, CA (US)

(73) Assignee: Bradley D. Parrish, Rialto, CA (US)

( * ) Notice: Subject to any disclaimer, the term of this patent is extended or adjusted under 35 U.S.C. 154(b) by 0 days.

(21) Appl. No.: 14/821,095

(22) Filed: Aug. 7, 2015

(51) Int. Cl.
  *H02G 3/18* (2006.01)
  *H02G 3/06* (2006.01)
  *H02G 3/04* (2006.01)
  *H02G 3/22* (2006.01)

(52) U.S. Cl.
  CPC ............... *H02G 3/06* (2013.01); *H02G 3/0462* (2013.01); *H02G 3/22* (2013.01)

(58) Field of Classification Search
  CPC ......... H02G 3/08; H02G 3/06; H02G 3/0616; H02G 3/081; H02G 3/22; H02G 3/30; H02G 3/383; H02G 15/00; H02G 15/113; H02G 3/02; H02G 3/0462; H02B 1/202
  USPC ....... 174/480, 481, 21 R, 68.1, 68.3, 50, 541, 174/559, 560, 60, 72 R, 92, 135, 74 R; 220/3.2, 3.3, 4.02; 138/111, 118.1, 138/109; 248/906
  See application file for complete search history.

(56) References Cited

U.S. PATENT DOCUMENTS

| | | | | | |
|---|---|---|---|---|---|
| 1,650,233 | A * | 11/1927 | Plunkett | ............... | H02G 3/0616 174/541 |
| 5,700,977 | A * | 12/1997 | Ford | ....................... | H02B 1/202 174/659 |
| 6,300,560 | B1 * | 10/2001 | Mankins | ................... | H02G 3/06 174/21 R |
| 7,109,416 | B1 * | 9/2006 | Reed | .................... | H02G 15/113 174/481 |
| 7,312,407 | B2 * | 12/2007 | Case | ....................... | H02G 3/383 174/135 |
| 7,435,905 | B1 * | 10/2008 | Elder | ...................... | H02G 3/081 174/92 |
| 7,582,835 | B2 * | 9/2009 | Pyron | ...................... | H02G 3/06 174/68.3 |
| 7,973,250 | B2 * | 7/2011 | Groeller | ................... | H02G 3/22 174/68.3 |
| 8,376,411 | B2 * | 2/2013 | Newby | ...................... | H02G 3/06 174/50 |

* cited by examiner

*Primary Examiner* — Angel R Estrada
(74) *Attorney, Agent, or Firm* — Plager Schack LLP

(57) ABSTRACT

A right angle conduit fitting for right angle wiring through a wall includes an offset split along a transverse axis defined by the edges of male and female body portions mated together. The offset split provides the male body portion and the female body portion independent rotation from each other and from internal wiring thus allowing the wiring to be disturbed as the male body portion and female body portion may be threaded onto respective conduits and into mating alignment with each other.

6 Claims, 5 Drawing Sheets

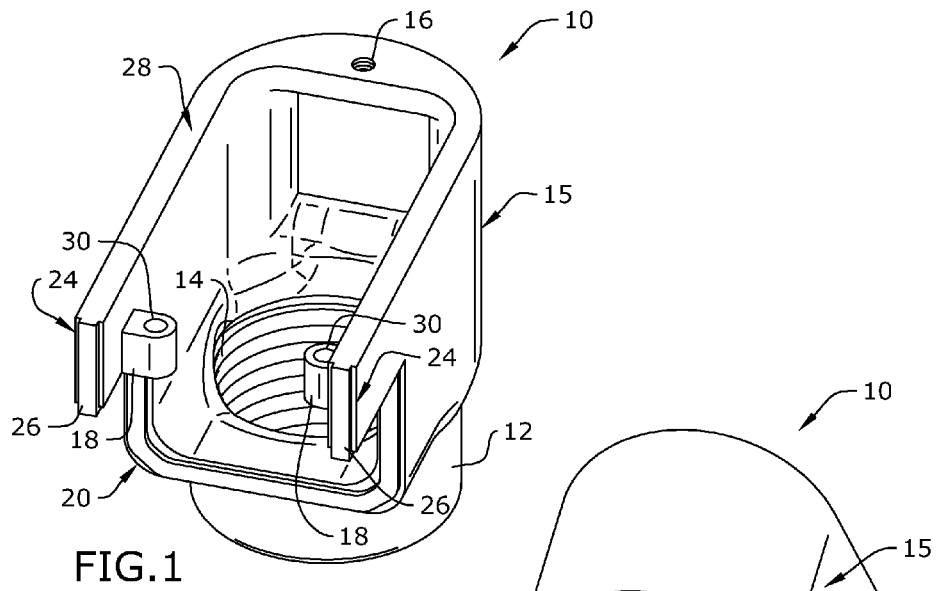
FIG.1
FIG.2
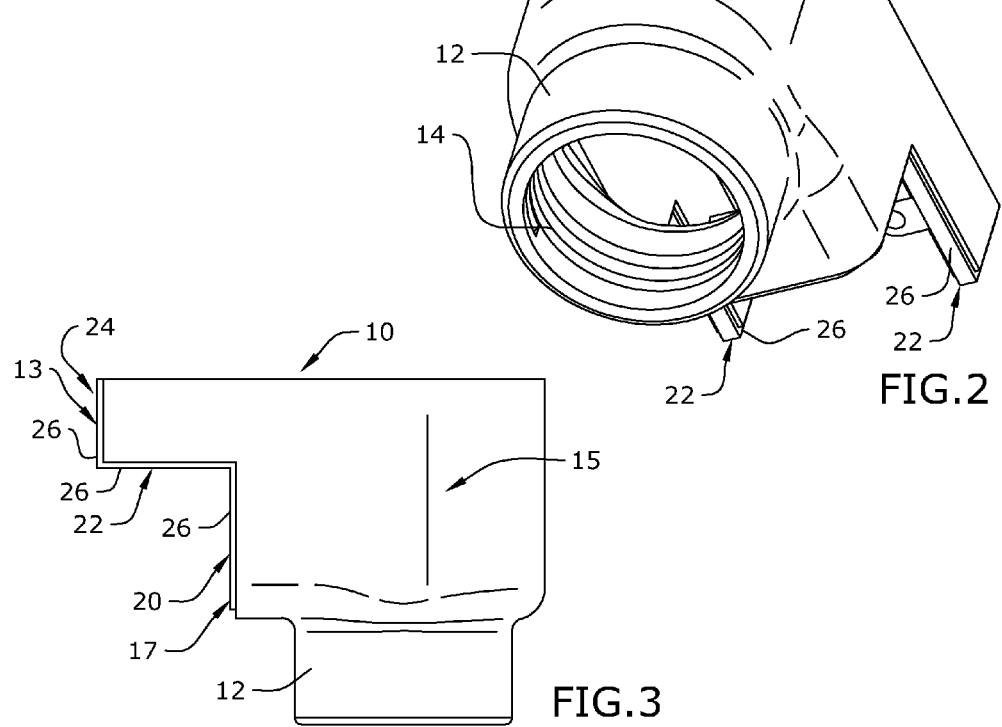
FIG.3

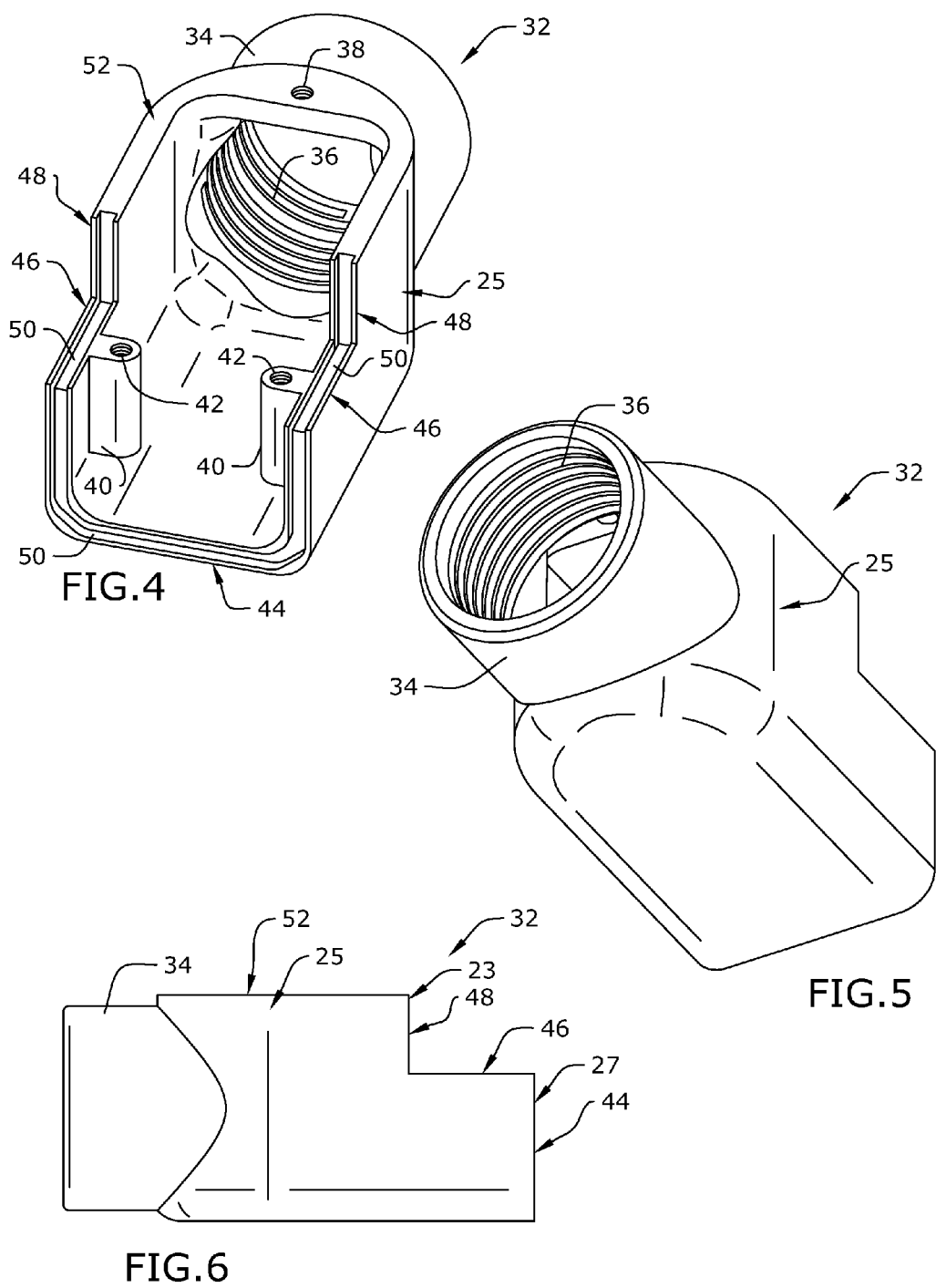

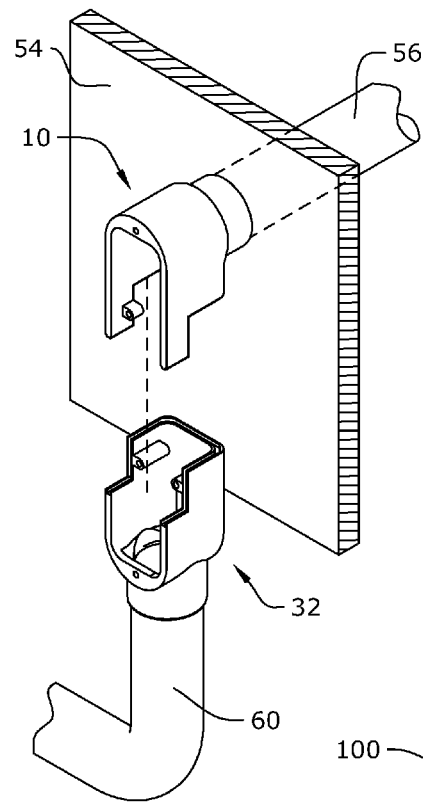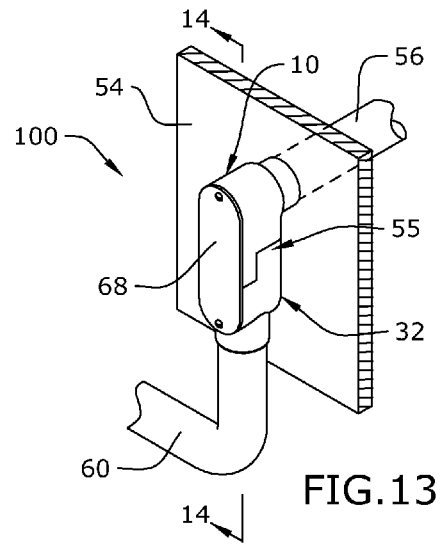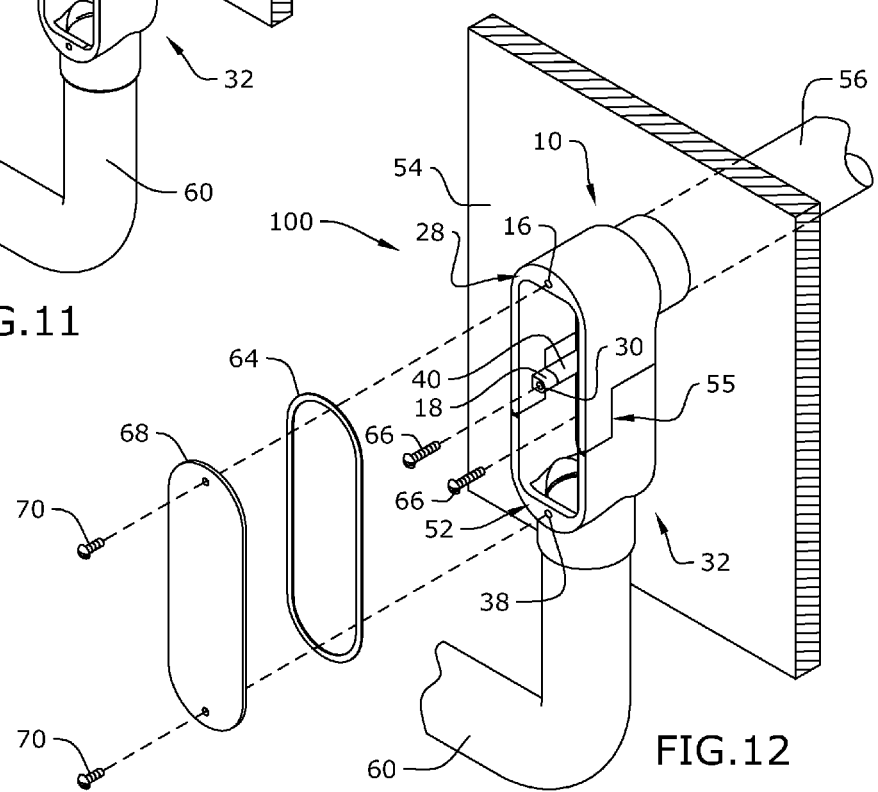

RIGHT ANGLE CONDUIT BODY WITH OFFSET SPLIT

BACKGROUND

The embodiments herein relate generally to conduit fittings and more particularly, to a right angle conduit body with an offset split.

Conventional conduit fittings are single piece fixed bodies. Conduit fittings for right angle routing generally have an entry that is perpendicular to the egress so that the wire is forcibly bent into a right angle. Such conventional fittings may be difficult to work with because the wire may not be easily bent and routed through the fitting without being damaged and because the wiring is inserted must be inserted through the fitting before securing the second of the two fitting ends onto the wall (or source depending on the direction wiring is being routed. Once the wiring is within the fitting, connecting the second end onto a threaded conduit involves rotating the fitting which also causes the wiring inside to turn. Heavy and/or long wiring may thus incur undesirable twisting and/or damage.

As can be seen there is a need for a conduit body that can be conveniently installed into a wall without damaging the internal wiring during installation.

SUMMARY

In one aspect, a right angle conduit body for right angle wiring through a wall comprises a male body portion including, a first housing portion, a first wiring port on a first end of the first housing portion, and a male projection projecting from the first housing portion along a longitudinal axis of the first housing portion, the male projection including a first right angle edge; and a female body portion including, a second housing portion, a second wiring port on a second end of the second housing portion, and a female receptacle on the second housing portion, the female receptacle including a second right angle edge configured to mate with the first right angle edge to form a mated right angle conduit body, the first and second right angle edges defining an offset split along a transverse axis of the mated right angle conduit body.

In another aspect, a right angle conduit body for right angle wiring through a wall comprises a male body portion including, a first housing portion, a first threaded wiring port on a first end of the first housing portion, the first threaded wiring port facing perpendicular from a longitudinal axis of the first housing portion, and a male projection projecting from the first housing portion along the longitudinal axis of the first housing portion, the male projection including a first right angle edge including a rail projecting therefrom; and a female body portion including, a second housing portion, a second threaded wiring port on a second end of the second housing portion, the second threaded wiring port positioned axial to the longitudinal axis of the first housing portion, and a female receptacle on the second housing portion, the female receptacle including a slotted second right angle edge configured to mate with the rail of the first right angle edge to form a mated right angle conduit body, the first and second right angle edges defining a Z-shaped offset split along a transverse axis of the mated right angle conduit body.

BRIEF DESCRIPTION OF THE FIGURES

The detailed description of some embodiments of the invention is made below with reference to the accompanying figures, wherein like numerals represent corresponding parts of the figures.

FIG. 1 is a top perspective view of a male portion of a split conduit fitting according to an embodiment of the subject technology.

FIG. 2 is a bottom perspective view of the fitting of FIG. 1.

FIG. 3 is a side view of the fitting of FIG. 1.

FIG. 4 is a top perspective view of a female portion of a split conduit according to an embodiment of the subject technology.

FIG. 5 is a bottom perspective view of the fitting of FIG. 4.

FIG. 6 is a side view of the fitting of FIG. 4.

FIG. 11 is a perspective view of the installed male fitting of FIG. 8 exploded from the installed female fitting of FIG. 10.

FIG. 12 is an exploded, perspective view of an installed right angle conduit with offset split according to an embodiment of the subject technology.

FIG. 13 is a perspective view of the installed right angle conduit with offset split of FIG. 12.

DETAILED DESCRIPTION OF CERTAIN EMBODIMENTS

Figures 14, 15:
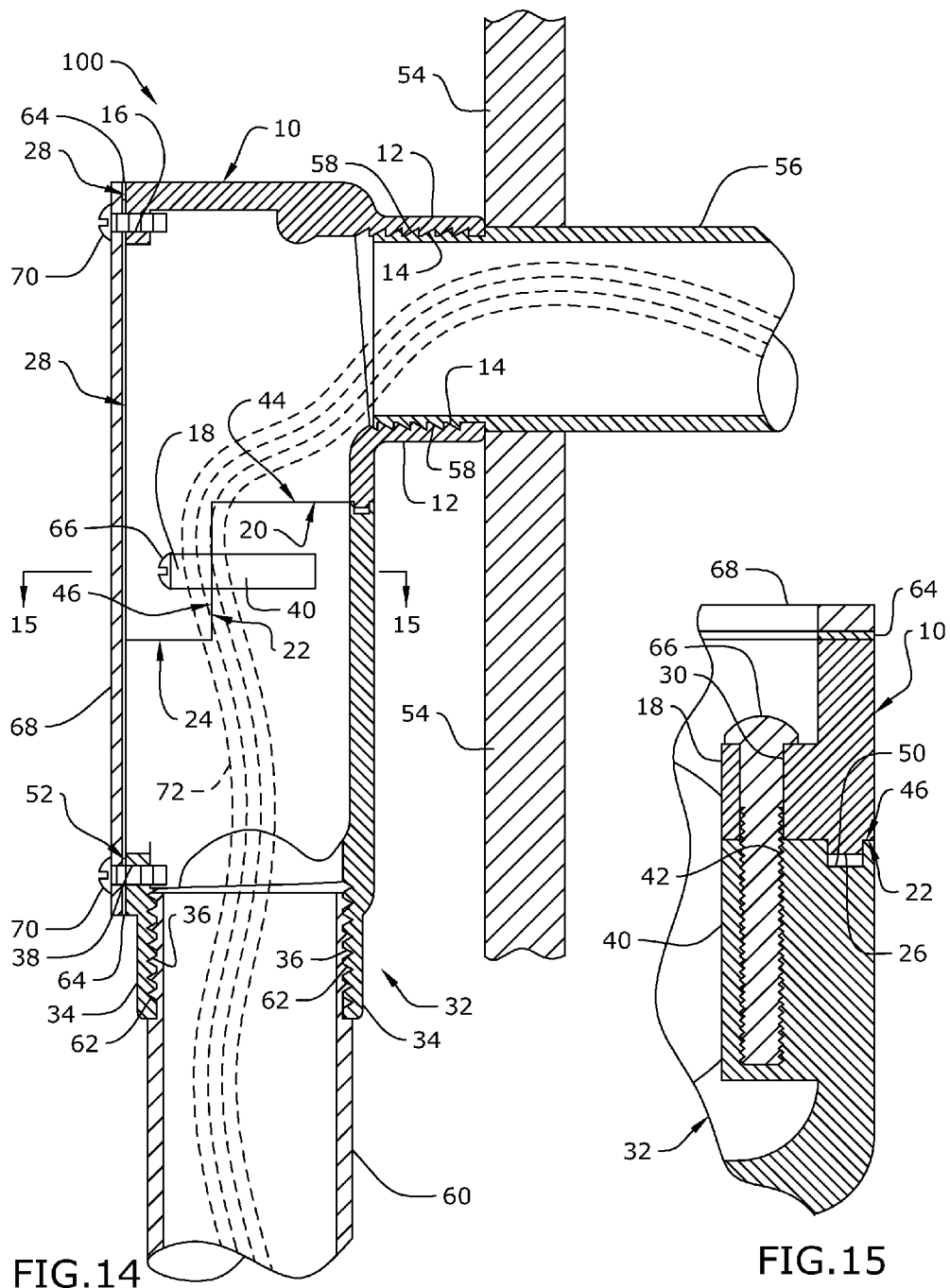
FIG. 14 is a cross-sectional side view of the installed right angle conduit with offset split of FIG. 12.
FIG. 15 is a cross-sectional view taken along the line 15-15 of FIG. 14.

Broadly, embodiments of the subject technology provide a right angle conduit fitting for right angle wiring through a wall. Aspects of the right angle conduit fitting facilitate for a technician installation of wiring to a fixed conduit in a wall without bending/damaging the wiring being pulled there through. In some embodiments, the conduit fitting may be a hollow LB conduit fitting redirecting the route of wiring along a wall so that the wiring goes through the wall following a safe bend radius. Referring to FIGS. 13-14 (which show an assembled embodiment of a right angle conduit fitting 100) and the Figures in general, one portion of the right angle conduit fitting 100 (sometimes referred to generally as the conduit fitting 100 or the fitting 100) may be threaded to an installed wall conduit. The other fitting body may threaded onto another conduit that is routing wiring along a wall. The wiring may be routed through the conduit fitting while the two portions are detached so that the wiring is routed 90 degrees into the wall upon mating of the two fitting portions. See for example FIGS. 6-15. As may be appreciated, the conduit fitting 100 is easier to use than conventional approaches which force wiring through a fixed right angle body and are difficult to work with.

Referring now to FIGS. 1-3, a male body portion 10 is shown which includes a male housing portion 15 and a threaded wiring port 12 with internal threading 14 on a first end of the male housing portion 15. In some embodiments, the threaded wiring port 12 may face perpendicular from a longitudinal axis of the male housing portion 15. The male body portion 10 also includes a male projection 20 projecting along the longitudinal axis of the housing portion 15. The male projection 20 may include a right angle edge 24 including a rail 26 projecting therefrom. A lower section of the male projection 20 defined by the right angle edge 24 may recede inward toward the housing portion so that a first mating surface 13 is forward from and offset from a second mating surface 17. In some embodiments, a threaded through hole 16 and profusions 18 with through holes 30 may be included for receipt of fasteners 70 (FIGS. 12 and 14) and 66 (FIGS. 12 and 15) respectively.

Referring now to FIGS. 4-6, a female body portion 32 is shown which includes a female housing portion 25 with a second threaded wiring port 34 including threads 36. The threaded wiring port 36 may be positioned axial with the longitudinal axis of the male or female housing portions. The female body portion 32 may also include a receptacle 44. The receptacle 44 may include a slotted right angle edge 50, for example a channel or receptacle configured to mate with the rail 26. An upper section of the receptacle 44 as defined by the right angle edge 50 may recede inward toward the housing portion so that a first mating surface 23 is forward from and offset from a second mating surface 27. In some embodiments, a threaded through hole 38 and profusions 40 with through holes 42 may be included for receipt of fasteners 70 (FIGS. 12 and 14) and 66 (FIGS. 12 and 15) respectively.

Referring now to FIGS. 12-13, the male housing portion is mated to the female housing portion to form an assembled right angle conduit fitting. In mated form, the right angle edges 24 and 50 define a Z-shaped offset split 55 along a transverse axis of the mated right angle conduit fitting. In some embodiments, a cover plate 68 and a gasket 64 may seal the interior of the right angle conduit fitting.

Figure 7:
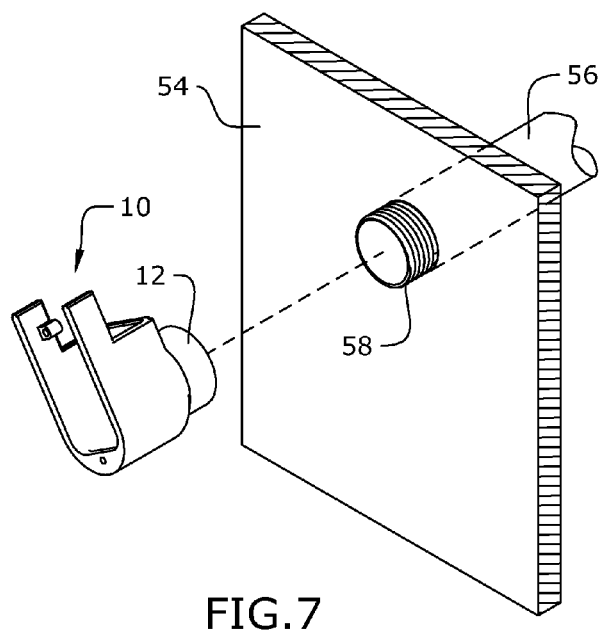
FIG. 7 is an exploded view of the male fitting of FIG. 1 being installed onto a fixed wall conduit.
Figure 9:
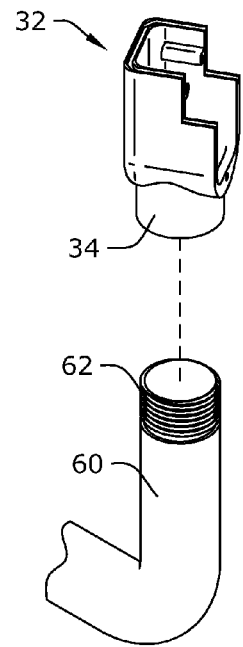
FIG. 9 is an exploded view of the female fitting of FIG. 4 being installed onto a right angle conduit.
Figure 8:
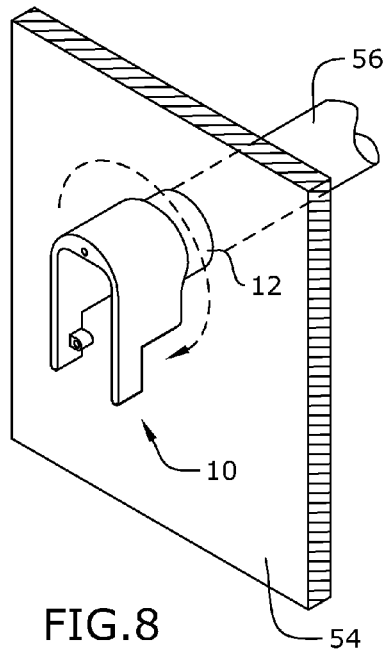
FIG. 8 is the male fitting of FIG. 7 rotated into installation on the wall conduit.
Figure 10:
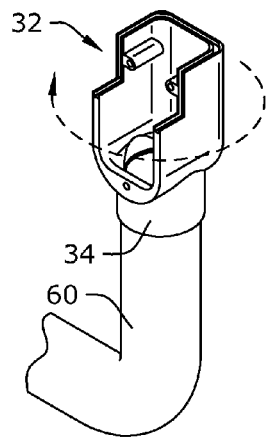
FIG. 10 is the female fitting of FIG. 9 rotated into installation on the right angle conduit.

Referring now to FIGS. 7-15, an exemplary installation of the male body portion 10 and female body portion 32 is shown to provide the mated right angle conduit fitting. It will be understood that either the male body portion 10 or the female body portion 32 may be installed first as aspects of the subject technology provide for convenient installation of wiring 72 (FIG. 14) through either piece for readily mating with the other piece without having to bend the wiring. In an exemplary process, the male body portion 10 may be screwed onto the threads 58 of a conduit 56 that is fixedly installed within a wall 54 (FIG. 7). The male body portion 10 may be rotated on the threads 56 until the male projection 20 is positioned as desired (FIG. 8). Typically, at this point wiring 72 is routed through the conduit 56 and the male body portion 10 however some approaches may wait to route the wiring 72 through all elements just before mating. The female body portion 32 may be attached to a right angle conduit 60 running parallel to the wall 54 (FIG. 9). The female body portion 32 may be rotated until the receptacle 44 is aligned for mating with the male projection 20. When both the male body portion 10 and female body portion 32 are attached to their respective conduits (56; 60) the routing of wiring 72 through each must be done. As will be appreciated, the male body portion 10 and the female body portion 32 may rotate independent of each other along axes that are perpendicular. In addition the male body portion 10 and the female body portion 32 may rotate independent of the wiring 72 running through each, thus allowing the wiring 72 there through to be undisturbed. However the offset split defined by respective edges 24 and 50 provide secure mating at an interface that is possible by mere rotation until each body portion (10; 32) is aligned with the other. In addition, the offset split defined by respective edges 24 and 50 allow wiring 72 to be routed to the conduit 56 from any angle orthogonal to the wall 54 and not merely from a vertical source as shown but also from horizontally and diagonally positioned conduits 60 if necessary.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A right angle conduit body for right angle wiring through a wall, comprising:
   a male body portion including,
   a first housing portion,
   a first wiring port on a first end of the first housing portion, and
   a male projection projecting from a second end of the first housing portion along a longitudinal axis of the first housing portion, the male projection including a first right angle edge; and
   a female body portion including,
   a second housing portion,
   a second wiring port on a first end of the second housing portion, and
   a female receptacle on a second end of the second housing portion, the female receptacle including a second right angle edge configured to mate with the first right angle edge to form a mated right angle conduit body, the first and second right angle edges defining a Z-shaped split positioned transverse to a longitudinal axis of the mated right angle conduit body and positioned intermediate the first wiring port and the second wiring port.

2. The right angle conduit of claim 1, wherein the first wiring port faces perpendicular from the longitudinal axis of the first housing portion.

3. The right angle conduit of claim 2, wherein the second wiring port is axial to the longitudinal axis of the first housing portion.

4. The right angle conduit of claim 1, wherein the first wiring port and the second wiring port are threaded.

5. The right angle conduit of claim 1, wherein the male projection includes a rail and the female receptacle includes a slot for receipt of the rail.

6. A right angle conduit body for right angle wiring through a wall, comprising:
   a male body portion including,
   a first housing portion,
   a first threaded wiring port on a first end of the first housing portion, the first threaded wiring port facing perpendicular from a longitudinal axis of the first housing portion, and
   a male projection projecting from a second end of the first housing portion along the longitudinal axis of the first housing portion, the male projection including a first right angle edge including a rail projecting therefrom; and
   a female body portion including,
   a second housing portion,
   a second threaded wiring port on a first end of the second housing portion, the second threaded wiring port positioned axial to the longitudinal axis of the first housing portion, and
   a female receptacle on a second end of the second housing portion, the female receptacle including a slotted second right angle edge configured to mate with the rail of the first right angle edge to form a mated right angle conduit body, the first and second right angle edges defining a Z-shaped offset split positioned transverse to a longitudinal axis of the mated right angle conduit body, the Z-shaped split positioned intermediate the first threaded wiring port and the second threaded wiring port.

* * * * *